April 15, 1969     R. P. SANDOR     3,438,302

REMOVABLE BLIND RIVET

Filed April 14, 1967

INVENTOR.
RAYMOND P. SANDOR
BY *Robert Ames Norton*

ATTORNEY 3,438,302
REMOVABLE BLIND RIVET
Raymond P. Sandor, 21 Cherry St.,
Darien, Conn. 06820
Filed Apr. 14, 1967, Ser. No. 630,959
Int. Cl. F16b 13/04
U.S. Cl. 85—84                                    4 Claims

ABSTRACT OF THE DISCLOSURE

A hollow rivet which can be inserted and applied from one side only, having a dome-shaped center and slit skirt lower portion which is expanded when the dome-shaped central portion is pushed down by a pin or screw. When the dome-shaped portion is in its upwardly curved position, the hollow rivet can be inserted in a hole, for example in two pieces of sheet metal. The top of the rivet has a flange which grips one sheet. When the dome-shaped portion is flattened out by pressing down or inserting and pressing down a pin or screwing down a screw, it is flattened out and the skirt expands into a series of fingers which grip the bottom side of another piece of metal, holding it firmly between the fingers and the top flange. The rivet is a blind rivet; that is to say, it can be introduced from one side only of a wall or of sheets of metal or other materials which are to be fastened together. It is not necessary to reach the other side either with a bucking iron or other device, as in the case of an ordinary rivet.

The rivet is removable, the dome-shaped portion being of springy material, such as spring metal, so that when the pin or bolt is moved upwardly the dome-shaped member resumes its domed form and the rivet can then be pulled out and reused.

Background of the invention

Rivets are very old devices for fastening together pieces of material, such as sheet metal, and in general the rivets require access to both sides of the metal pieces to be fastened together. The end of the rivet is then expanded, for example by upsetting or mushrooming the ends in the case of a solid rivet by pounding the rivet against a bucking iron or other piece of equipment, or by spreading the ends of split rivets using a wedged shape bucking iron. In both types of rivets the fact that access to both sides of the sheets is necessary in order to set the rivet creates a considerable problem as it is not always convenient or even possible to obtain access to both sides of sheets of metal to be fastened together. Where bucking tools are required on the far side of the materials, it is also necessary that they be held so that the rivet head can be upset by pounding against the bucking iron or the heads of split rivets expanded. This creates a problem where the materials have to be fastened together in various erection sites, because a second person or, in the case of certain very small pieces of material, a second hand is required to hold the bucking iron or other tool. For production operations in a factory it is, of course, possible to have the bucking tool rigidly held in the form of an anvil or similar shape in a riveting machine. However, this is limited to riveting connections which are made in a factory where the necessary machines and jigs are available.

In all ordinary rivets the end of the rivet has to be upset or expanded, and in the case of solid rivets this requires either that the material be sufficiently soft for upsetting purposes or, in the case of rivets that are used for example in steel work, the rivet is heated until it is sufficiently soft so that when hammered against the bucking iron the end expands or mushrooms to the suitable point. Hammering also is a problem, for while in some cases it is practical to do this by hand, usually a pneumatic or other hammer, such as a pneumatic riveting gun, is needed in order to assure that the end of the rivet is suitably upset so as to grip tightly the sheets of materials which are to be held together. All of these factors introduce problems, but nevertheless riveting is in so many ways such a satisfactory method of connection that it is used extremely widely in spite of the more complex equipment required.

Blind rivets are used where access is readily available to only one side of the sheets of material or other elements which are to be riveted together. For such purposes so-called blind rivets have been developed. One kind involves upsetting or expanding the end of the rivet after it has been inserted by explosive force of a small charge of explosive in the end of the rivet. This requires, of course, only heating somewhat the head of the rivet. Another form of blind rivet has a central stem which sticks out beyond the head. With a special tool which bears against the head of the rivet and pulls the stem with great force, this causes the end of the rivet to be pulled up and forced to expand against the material. While this has been a solution to the problem of blind riveting, it has been an expensive solution because the rivets are much more costly than ordinary rivets, and sometimes the stem breaks off, leaving a jagged end.

Another approach to the blind rivet or blind fastener problem is presented where it is necessary to obtain fasteners in walls which have to support a considerable amount of weight or pull. In many cases the walls are of plaster, plasterboard and the like, and so the ordinary methods of fastening by nails and screws, which are satisfactory for wooden walls, is not practical. For this type of fastening two structures have been developed, one of which is a very long, hollow stem on the fastener, having slots cut from the point approximating the position of the inside of the wall to an end which usually has a closed metal piece with a threaded opening. The whole is inserted through a drilled hole in the wall and a bolt is then screwed in which pulls up the threaded end of the stem, causing the stem to be pulled against the wall and the slitted portions to expand as fingers, which grip the wall tightly. The bolt may then be used for fastening anything into the fastener and can, of course, be removed. Another modification, which is used more commonly in masonry walls, such as concrete, involves a soft expandable material, such as lead, the material being hollow and insertable into a hole. In the hollow part there is then screwed in a tapered screw which causes the lead or other material to expand, gripping the hole tightly.

The fastenings above referred to are quite expensive and are not satisfactory for holding together two pieces of material because once the slitted stem of one type has been caused to collapse in the form of fingers or the soft material, such as lead, has been forced to expand by screwing in a tapered screw, it holds together anything that is pierced by the initial hole and it results in a relatively long protrusion of the long bolt which was used to pull up the end of the collapsible slitted stem. This limits use where there is not much room back of a wall or back of two materials that are to be joined together. The expandable soft material type also is usable only in materials which have great strength against the expansion of the soft material and is, naturally, also a permanent fastening, as are the other rivets which have been described above.

Where it is never necessary to remove a rivet, that is to say where the materials held together by the rivet are a permanent construction, the riveting is satisfactory, and this accounts for its extremely widespread use with a great number of materials. However, there are numerous situations where it is desired at some time to remove a rivet and/or to remove and re-insert it. Such situations arise, for example, where a rivet becomes loose in use or where it is desired to take two pieces of material apart at some time in the future after they have been riveted together. When this occurs, very serious problems are presented. It is normally necessary to drill out the old rivet, pull it out in small pieces, and frequently this results in a damaging or burring of the holes in the pieces of material which were riveted together, and may even in some cases make a re-riveting impractical or unsatisfactory.

The problem of a riveted construction in which the rivets can be removed easily and simply without damaging the materials has not been solved, and thus the field for riveting construction has been restricted or removal of rivets and re-riveting has been costly and sometimes unsatisfactory. For this reason, when materials are to be held together under conditions where it may be desired to separate them again, other means, such as bolts or nuts, screws, either wood or sheet metal, have ordinarily been used. Such procedures add to cost; for example, it may be necessary to thread either portion of the materials or nuts, and in the case of sheet metal screws and other screws if they are unscrewed and screwed in again a number of times they tend to loosen. Nevertheless, when materials must be held together for a time but may need to be separated at some time in the future, the more awkward and/or more expensive methods of bolting, screwing and the like have per force been used and their disadvantages have been tolerated in order to achieve the possibility of taking the materials apart.

*Summary of the invention*

The present invention solves the problems of blind riveting and in its preferred forms of riveting which can be removed quickly and easily and without damaging materials held together. Essentially the present invention uses a hollow rivet with a suitable flange at the top and a domed or bowed portion near the rivet end which can be flattened out by pushing in with a tool, pin, bolt or the like. The flattening out of the upwardly curved portion causes the skirt of the hollow rivet end to expand. The skirt is preferably slitted so that it can expand into fingers without requiring stretching of the material of the skirt, although in its broadest aspect the present invention does also include rivets in which the skirt can expand without being slitted. However, the slitted construction is cheap and satisfactory and so constitutes a preferred embodiment.

It is not necessary that the hollow rivets be made of one material, although in many cases they can be easily stamped out of sheet metal, and where this is done many very economical constructions are possible. On the other hand, it is perfectly possible to have the hollow rivet made of a different material, such as for example a tough, strong plastic, such as certain nylons. Then the dome-shaped element on expansion pushes out slotted fingers from the plastic skirt which clamp the rivet tightly against the other side of the materials to be held together.

If it is desired to remove the rivet, all that is necessary is to restore the dome-shaped element to its original shape, which contracts the skirt end of the rivet and permits ready removal in the same manner as was possible when the rivet was inserted, because after the dome shape has been restored the rivet has the same uniform external diameter and so can readily be removed from the hole drilled through the materials to be fastened together.

A preferred embodiment of the invention utilizes springy material, such as spring steel, Phosphor bronze and the like, at least for the dome-shaped portion of the rivet. This makes it easy to snap the dome into its original form and to remove the rivet. Therefore, the springy material construction is a preferred embodiment and for many purposes presents practical advantages, as will be brought out below. Of course the dome-shaped material need not be springy, but in such a case it has to be pulled back into the dome shape, which is sometimes less convenient. Such a construction, however, is included in the broader aspects of the invention.

The flattening out of the dome shape may be done by a pin, a screw, in which case there is a hole in the dome which is threaded, or a special tool may be used, which is then removed. Because of the simplicity of the constructions using pins and screws, these are preferred, and the rivets ordinarily are sold in this modification with the pin already in the hole in the dome. For example a pin with a suitable collar so that when it is pulled upwardly it will cause the dome to be puled up to its former shape, or in the case of the preferred springy material, snap up. Such composite rivets, which include an actuating pin or bolt, are therefore included in a specific aspect of the invention.

The present invention may be considered both from the standpoint of a new form of rivet as a new article and also as a new process for fastening together various materials. In every case the present invention eliminates the need of access to the other side of the materials to be fastened together, completely eliminates the need for bucking or expanding tools, and so has all of the advantages of the known types of blind rivets. At the same time it makes possible the removal of a rivet without drilling out and cutting off or without damage to the materials being held. In other words, the present invention presents a happy combination of the new function, ready removability, with all of the advantages of blind rivets. Often a desirable new function requires some compromise in other qualities, but this is not the case in the present invention and this is, therefore, an advantage.

*Description of the preferred embodiments*

Figure 1:
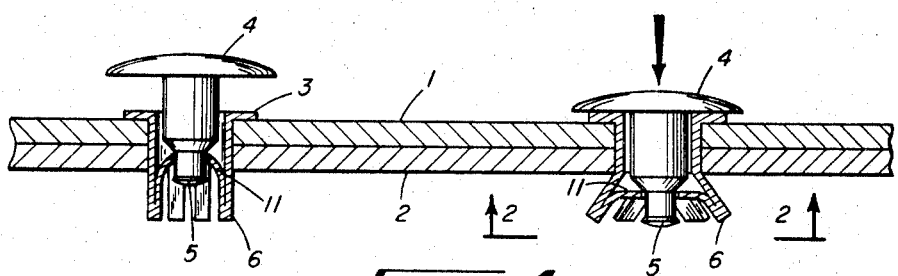
FIG. 1 is a section through two pieces of material showing a rivet inserted and other rivet in its clenched state.

In FIG. 1 two pieces of material, which are shown typically as two pieces of sheet metal 1 and 2, are drilled with holes which mate and a hollow rivet is inserted. This rivet has a top flange 3, a dome-shaped central portion 11 with a hole into which the grooved end 5 of a pin 4 is fastened. The edges of the dome-shaped element 11 bear on a slitted skirt 6 which is thus divided into a series of tabs or fingers. In the form of rivet shown in FIG. 1, the hollow rivet is made of spring steel or similar springy material, such as Phosphor bronze.

Figure 2:
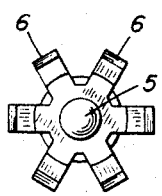
FIG. 2 is a plan view along the line 2—2 of FIG. 1 looking in the direction of the arrow.

When the rivet has been inserted from one side, the pin 4 is pushed down, either by a steady pressure or by hammer blows, and this causes the dome 11 to flatten out, which results in spreading out the fingers 6 of the slotted skirt. This is shown at the right of FIGURE 1 and is also illustrated in the plan view of FIG. 2. Once the pin 4 has been pressed down, the two pieces of metal 1 and 2 are permanently fastened and held by the hollow rivet between its top flange 3, which bears on one piece of metal, and the fingers 6, which are expanded and bear on the opposite side of the other piece of metal. A tight riveted structure results, and as long as the pin 4 occupies the position shown at the right of the figure, the fastening is permanent and is tight, having all of the advantages of ordinary riveted construction.

If it is ever desired to remove the rivet, a screwdriver or other bladed element is inserted under the head of the pin 4 and this is pried up. For a short distance, namely the width of the groove in the grooved end 5, great force is not required as the pin is held only by friction of the flattened dome pressing against the straight section of the groove. This permits the pin to move a short distance above the plate 1 without exerting great force and puts it in a position where it can be grasped and more force exerted to snap the dome 11 into its concave position, thereby minimizing or eliminating damage to the plate 1. After moving a short distance past the toggle position of the dome 11, the latter snaps into its upper or domed position. The hollow rivet once more has a uniform external diameter and can be very simply pulled out of the holes. It should be noted that this does not damage the hole and does not require any destruction or damage of the rivet itself. If desired, the rivet can be reused and the operation can be repeated.

Figure 3:
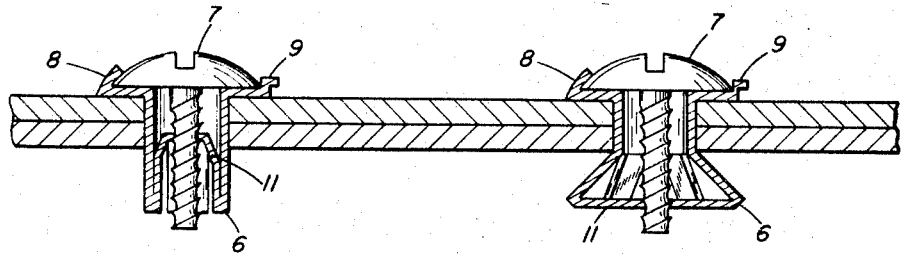
FIG. 3 is a cross section of a modified form of rivet.

In FIG. 3 a somewhat different construction is used, the same elements bearing the same reference numerals. Now, however, instead of having a simple flange 3 at the top, a flange is provided with a locking lip 8 and a portion 9 which can be pried up if necessary. Instead of a pin a threaded bolt 7 enters into a threaded opening in the dome 11. When this bolt is screwed down, it forces the dome 11 to flatten out, expanding the slitted fingers 6 of the skirt of the rivet in the same manner as in FIG. 1. Again, at the left the rivet is shown inserted into the holes and at the right after screwing up the screw to expand the fingers 6 to form the tight rivet connection, as is shown on the right in FIG. 1. The lip 8 prevents the head of the bolt from rising when it is screwed down, and if it is desired to remove the rivet after it has been unscrewed to restore the element 11 into its domed shape, the rivet can be removed. Unscrewing the bolt does not require applying a screwdriver blade to the plate 1 and normally eliminates any risk of marring. Sometimes a rivet will stick for reasons of rust or other causes and so a small portion of the rivet flange at 9 is shaped so that a screwdriver blade can be inserted under it to remove a rivet if it sticks slightly.

FIG. 3 illustrates another modification of the invention in which the dome 11 need not be springy material but is capable of flattening out. The construction is not quite as simple as in the modification shown in FIG. 1 with a pin, but because great force can be exerted on the dome 11 by the bolt, the riveted connection is extremely strong. For certain purposes where maximum strength of riveted connection is desired or where it is desired to prevent any possibility, however remote, of the pin 4 being inadvertently pulled up, the construction of FIG. 3 is worth the additional cost involved by the more complex flanging and the use of a bolt with tapped hole in the dome 11. Obviously, of course, in FIG. 3 the dome 11 could be of springy material, although this is not so necessary or important as in the modification in FIG. 1. After all, the bolt 7 when it is screwed in exerts a very great pull on the domed material 11 and can pull it up even if it does not tend to snap up because of its own springiness. Of course, the modification of FIG. 1 can also be made with domed material which is capable of flattening out but which is not springy.

For many purposes it is desirable to have a hollow rivet which is primarily made of a tough plastic, such as nylon. This has certain advantages. For example, there is no chance of marring the surface of the materials held together and the fingers 6 in the clenched position do not have any sharp metallic edges. Therefore, where the other side of the two pieces of material, the bottom as shown in the drawings, is in a position where it can be encountered by persons, the use of a plastic rivet presents some advantages. In some cases also a composite rivet of plastic and metal is cheaper to construct.

Figure 4:
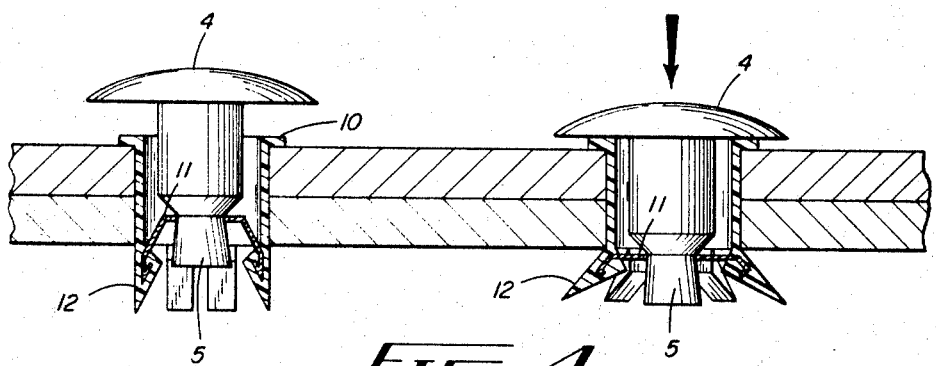
FIG. 4 is a cross section of materials fastened with a rivet formed of a plurality of materials.

In FIG. 4 the walls, incuding the slitted skirt, and a top flange 10 are made of tough plastic, such as nylon. The dome-shaped metal member 11 is molded into the nylon and a pin 4, with a grooved end 5, is mounted in the opening in the element 11 exactly as in FIG. 1. When the pin is pressed down in the direction of the arrow at the right hand side of the figure, the dome-shaped element 11 is flattened out, and if springy will snap out, and pushes out the plastic fingers 12. The clamping occurs exactly the same as in FIG. 1 and removal of the rivet by prying up the head of the pin 4 can be effected in the same manner.

It is possible, of course, to make a nylon rivet in the form shown in FIG. 3 where the dome-shaped element is moved out by means of a bolt. As with metal rivets, the pin modifications of FIGS. 1 and 4 lend themselves to a cheaper construction, and where the grip of the hollow rivets is of adequate strength, as is the case in a very large number of uses, this modification has cost advantages and is preferred.

It is not necessary to have a pin permanently part of the rivet. The hollow rivet may be made without a pin and the dome-shaped element flatened out by pressing in a tool. In such a case the tool is removed and the hollow rivet does not have a pin or bolt with a slightly protruding head. For certain purposes this is desirable, but of course the removal of a rivet is not quite as simple as in the modification shown, it being necessary to re-dome the element 11, which, however, can be done by leaving a small hole in the middle into which a hook or other tool can be inserted. Of course this can also be a tapped hole and a bolt can be inserted to give sufficient grip to a force which would restore the dome 11 to its original shape.

I claim:
1. A removable blind rivet capable of removal without damaging riveted material comprising:
   (a) a hollow member provided with a top flange member;
   (b) the opposite end of the hollow member being in the form of a slitted skirt,
   (c) a concave dome-shaped element inside the hollow rivet and bearing with its periphery against the slitted skirt, said dome-shaped element having a central opening,
   (d) an actuating pin having a head of larger diameter than the rivet and a grooved opposite end, the groove being of a length substantially in excess of the thickness of the material of which the dome-shaped member is formed and the groove being of cross section comparable with that of the opening in the dome-shaped element, the end of the pin having a diameter larger than the opening in the dome-shaped element but sufficienty small so that it can be pressed through the opening and constitute a snap fitting with the dome-shaped element, the cross section of the pin above the groove being larger than the opening in the dome-shaped member and incapable of being pushed therethrough, and
   (e) the length of the pin from the bottom of its enlarged head to the top of the groove being sufficiently long so that when the pin is pressed in until its head strikes the flange member the dome-shaped element is flattened out and forces the slitted skirt to expand into fingers which clench against the materials to be riveted, whereby in this position the grooved portion of the pin is held by the dome with only moderate friction and the pin can be pried up the distance of the groove without exerting great force on the materials to be riveted and hence minimizing the possibility of marring the surface thereof.

2. A rivet according to claim 1 in which the dome-shaped element is of spring inextensible material.

3. A rivet according to claim 1 being formed of plastic with a separate metal dome-shaped element bearing on the slitted skirt of the plastic rivet body.

4. A removable blind rivet comprising,
   (a) a hollow member provided with a top flange member,
   (b) the opposite end of the hollow member being in the form of a slitted skirt, (c) a concave dome-shaped element inside the hollow rivet and bearing with its periphery against the slitted skirt,
(d) a central opening in the dome-shaped element having edges capable of cooperating with threads of a bolt, and
(e) a threaded bolt having an enlarged head larger than the diameter of the rivet and the bolt having a threaded portion screwable through the opening in the dome-shaped element, the bolt being of sufficient length so that when rotated in one direction the dome-shaped element is flattened out causing the slitted skirt to expand into fingers which clench against the materials to be riveted and when rotated in the opposite direction restores the dome-shaped element substantially to its original configuration, the top flange member having a turned back lip extending at least part way around its periphery and engaging the head of the bolt, which does not permit the bolt to rise above the flange-shaped element.

References Cited

UNITED STATES PATENTS

| 1,856,508 | 5/1932 | Price | 85—84 |
| 2,344,717 | 3/1944 | Mills et al. | 85—82 |
| 2,358,578 | 9/1944 | Keehn | 85—82 |
| 2,948,937 | 8/1960 | Rapata | 85—82 |
| 3,017,658 | 1/1962 | McMeen et al. | 85—84 |
| 3,116,528 | 1/1964 | Poe | 85—84 |

EDWARD C. ALLEN, *Primary Examiner.*